(12) United States Patent
Kokeguchi

(10) Patent No.: US 8,254,012 B2
(45) Date of Patent: Aug. 28, 2012

(54) DISPLAY ELEMENT

(75) Inventor: Noriyuki Kokeguchi, Tokyo (JP)

(73) Assignee: Konica Minolta Holdings, Inc. (JP)

( * ) Notice: Subject to any disclaimer, the term of this patent is extended or adjusted under 35 U.S.C. 154(b) by 820 days.

(21) Appl. No.: 12/304,361

(22) PCT Filed: Jun. 5, 2007

(86) PCT No.: PCT/JP2007/061363
§ 371 (c)(1),
(2), (4) Date: Dec. 11, 2008

(87) PCT Pub. No.: WO2007/145100
PCT Pub. Date: Dec. 21, 2007

(65) Prior Publication Data
US 2009/0201239 A1   Aug. 13, 2009

(30) Foreign Application Priority Data
Jun. 15, 2006   (JP) .................................. 2006-165694

(51) Int. Cl.
*G02F 1/153* (2006.01)
(52) U.S. Cl. ...................................................... 359/270
(58) Field of Classification Search ................... 359/270
See application file for complete search history.

(56) References Cited

U.S. PATENT DOCUMENTS

| 4,240,716 A | 12/1980 | Camlibel et al. |
| 2006/0152438 A1 | 7/2006 | Tanaka |

FOREIGN PATENT DOCUMENTS

| EP | 1445646 A1 | 8/2004 |
| EP | 1510854 A1 | 3/2005 |
| JP | 2003-149687 | * 5/2003 |
| JP | 2003-241227 | 8/2003 |
| JP | 2004-170850 | * 6/2004 |
| JP | 2004-170850 A | 6/2004 |
| JP | 2005-189386 | * 7/2005 |
| JP | 2005189386 A | 7/2005 |
| JP | 2005-284148 | * 10/2005 |
| JP | 2005-284148 A | 10/2005 |
| JP | 2005-345777 | * 12/2005 |
| JP | 2005-345777 A | 12/2005 |

OTHER PUBLICATIONS

International Search Report for International Application No. PCT/JP2007/061363 mailed Jul. 10, 2007 with English Translation.
Supplementary European Search Report for Appl. No. 07744715.9-2205 / 2028539 PCT/JP2007061363 mailed Apr. 24, 2009 in English.

* cited by examiner

*Primary Examiner* — Joseph P Martinez
(74) *Attorney, Agent, or Firm* — Cantor Colburn LLP

(57) ABSTRACT

A display element in which reduced variation in color in the midtone has been achieved even when repeatedly driven is disclosed, comprising opposing electrodes and an electrolyte containing silver or a compound including silver in the chemical structure between the opposing electrodes, wherein the opposing electrodes are driven so that the silver is dissolved or deposited and the following requirement is satisfied:

$$A1/A2 > 4$$

in which A1 (mA/cm$^2$) is a maximum value of absolute values of an electric current applied between the opposed electrodes when driven in the direction of from a state of no silver being deposited on the side of the display electrode to that of the silver being deposited and A2 (mA/cm$^2$) is a maximum of absolute values of an electric current applied between the opposing electrodes when driven in the direction of from a state of no silver being deposited on the side of the display electrode to that of the silver being dissolved.

6 Claims, No Drawings

DISPLAY ELEMENT

CROSS REFERENCE TO RELATED APPLICATIONS

This is a U.S. national stage of application No. PCT/JP2007/061363, filed on 5 Jun., 2007. Priority under 35 U.S.C. §119(a) and 35 U.S.C. §365(b) is claimed from Japanese Application No. 2006-165694, filed 15 Jun., 2006, the disclosure of which is also incorporated herein by reference.

TECHNICAL FIELD

The present invention relates to electrochemical display elements employing solution deposition of silver.

TECHNICAL BACKGROUND

Recently, along with enhancement of the operating speed of personal computers, the spread of network infrastructures, and increased and lower-priced mass storage, data of documents or image, which were conventionally printed on paper, can be received simply as electronic information so that opportunities to read such electronic information have increased dramatically.

There were used, as a means for reading electronic information, conventional liquid crystal displays or CRT and recent emission type displays, such as organic electroluminescence displays. Specifically, when electronic data is document data, it is necessary to notice this reading means over a relatively long period of time. It is hard to say that such an action is a kindly means to humans. There are generally known disadvantages of emission type displays such that flickering tires human eyes, they are awkward to carry about, the reading posture is restricted, it is necessitated to gaze at a stationary picture plane, and electric power consumption increases when reading over a long time.

As a display means to redeem the foregoing disadvantages is known a reflection display having memory capability which employs external light and does not consume power for image retention. However, based on the reasons below, it is hard to say that such a display provides sufficient performance.

For instance, a system using a polarizing plate such as a reflection type liquid crystal display exhibits a relatively low reflectance up to 40%, resulting in difficulty in displaying whiteness and methods of preparing constituent members are not necessarily simple. A polymer dispersion liquid crystal display requires a relatively high voltage and employment of the difference in refractive index between organic compounds does not result in images with sufficient contrast. A polymer network type liquid crystal display has problems such that it requires a relatively high voltage and a complex TFT circuit to enhance memory. An electrophoretic display element needs relatively high voltage of more than 10 V, and there is concern of durability of the electrophoretic particles, due to their tendency to coagulate. An electrochromic display element, which can be driven at a relatively low voltage of not more than 3 V, has problems that it is insufficient in color quality of black or colors (such as yellow, magenta, cyan, blue, green and red) and its display cells require complex layer arrangement such as a deposit layer to maintain memory.

There is known, as a display system to overcome these disadvantages of the foregoing systems, an electro-deposition (hereinafter, also denoted simply as ED) system which employs dissolution-deposition of metals or metal salts. The ED system, which can be driven at a relatively low voltage of not more than 3 V, exhibits advantages such as simple cell constitution and being superior in black and white contrast and in black color quality. There were disclosed various methods (as described in, for example, Patent documents 1-3).

As a result of the inventor's detailed study of the technique disclosed in the foregoing patent documents, it was proved that in conventional techniques, there were produced problems such that repeatedly driving resulted in variation in color in the midtone.

Patent document: U.S. Pat. No. 4,240,716
Patent document 2: Japanese Patent No. 3428603
Patent document 3: JP-A No. 2003-241227 (hereinafter, JP-A refers to Japanese Patent Application publication)

DISCLOSURE OF THE INVENTION

Problem to be Solved

The present invention has come into being in view of the above-described problems and it is an object of the invention to provide a display element in which reduced variation in color in the midtone has been achieved even when repeatedly driven.

Means for Solving the Problem

The object of the invention was realized by the following constitutions:

1. A display element comprising opposing electrodes and an electrolyte containing silver or a compound including silver in the chemical structure between the opposing electrodes, wherein the opposing electrodes are driven so that the silver is dissolved or deposited and the following requirement is satisfied:

$$A1/A2>4$$

wherein A1 (in mA/cm$^2$) is the maximum of absolute values of an electric current applied between the opposed electrodes when driven in the direction of from a state of no silver being deposited on the side of a display electrode to that of the silver being deposited and A2 (in mA/cm$^2$) is the maximum of absolute values of an electric current applied between the opposing electrodes when driven in the direction of from a state of no silver being deposited on the side of the display electrode to that of the silver being dissolved.

2. The display element as described in 1, wherein the opposing electrodes are driven in the direction of from a state of no silver being deposited on the side of the display electrode to that of the silver being dissolved before driven in the direction of from a state of no silver being deposited on the side of the display electrode to that of the silver being deposited.

3. The display element as described in 1 or 2, wherein the following requirement is satisfied:

$$1.2 \leq d/L \leq 100$$

wherein d (μm) is a distance between the opposed electrodes and L (μm) is a minimum of distances between adjacent electrodes on the non-observation side of the opposing electrodes.

4. The display element as described in any one of 1 to 3, wherein the following requirement is satisfied:

$$0.1 \leq Ra \leq 100$$

wherein Ra (nm) is a surface roughness of an electrode of the non-observation side of the opposing electrodes of the display element.

5. The display element described in any one of 1 to 4, wherein the electrolyte comprises at least one compound represented by the formula (1) or (2) and at least one compound represented by the formula (3) or (4):

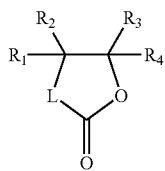

formula (1)

wherein L is an oxygen atom or $CH_2$; $R_1$ through $R_4$ are each a hydrogen atom, an alkyl group, an alkenyl group, an aryl group, a cycloalkyl group, an alkoxyalkyl group or an alkoxy group;

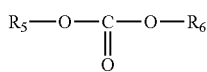

formula (2)

wherein $R_5$ and $R_6$ are each a hydrogen atom, an alkyl group, an alkenyl group, an aryl group, a cycloalkyl group, an alkoxyalkyl group or an alkoxy group;

formula (3)

wherein $R_7$ and $R_8$ are each a substituted or unsubstituted hydrocarbon group, provided that when $R_7$ or $R_8$ combine with each other to form a S-containing ring, the ring is not an aromatic group;

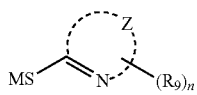

formula (4)

wherein M is a hydrogen atom, a metal atom or a quaternary ammonium; Z is a nitrogen-containing heterocyclic ring; n is an integer of 0 to 5; $R_9$ is a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxy group or a heterocyclic group, provided that when n is 2 or more, $R_9$s may be the same or different or may combine to form a condensed ring.

6. The display element described in any one of 1 to 5, wherein the display element satisfies the following relation (1):

$$0 \leq [X]/[Ag] \leq 0.01 \qquad \text{relation (1)}$$

wherein [X] is a molar concentration (mole/kg) of halogen ions or halogen atoms contained in the electrolyte and [Ag] is a total molar concentration (mole/kg) of silver contained in the electrolyte or silver included in the compound including silver in its chemical structure.

Effect of the Invention

According to the present invention, there was provided a display element in which reduced variation in color in the midtone was achieved even when repeatedly driven.

PREFERRED EMBODIMENTS OF THE INVENTION

In the following, there will be detailed preferred embodiments of the invention.

As a result of extensive study in light of the problems described above, the inventors of this application discovered that according to the display element described below, the said display element which was constituted of simple components, was drivable at a relatively low voltage and exhibited high display contrast and white display reflectance, and current leakage of from an electrode of the non-observation side to an adjacent electrode was reduced, resulting in reduced variation in color in the midtone was achieved even when repeatedly driven, and the present invention has come into being; thus, a display element comprises opposing electrodes having therebetween an electrolyte containing silver or a compound including silver in its chemical structure, in which the opposing electrodes are driven so that the silver is dissolved or deposited and satisfies the requirement of A1/A2>4 in which A1 (in $mA/cm^2$) is the maximum of absolute values of an electric current applied between the opposed electrodes when driven in the direction of from the state of no silver being deposited on the side of the display electrode (that is the observation side of the display element) to the state of the silver being deposited and A2 (in $mA/cm^2$) is a maximum of absolute values of an electric current applied between the opposing electrodes when driven in the direction of from the state of no silver being deposited on the side of the display electrode to that of the silver being dissolved.

Reduction of current leakage can prevent unintended silver deposition on the individual pixel electrodes of the non-observation side, caused by current leakage, whereby driving in the direction of from a state of no silver being deposited on the side of the display electrode to that of the silver being deposited is stably performed, rendering it feasible to realize a display element in which reduced variation in color in the midtone has been achieved even when repeatedly driven.

In the following, there will be detailed the present invention.

The display element of the invention is one of an ED type system which comprises opposing electrodes having therebetween an electrolyte containing silver or a compound including silver in its chemical structure and the opposing electrodes are driven so as to results in dissolution and deposition of silver.

Silver or Compound Including Silver in Chemical Structure:

The term "silver or compound including silver in its chemical structure", according to the present invention, is a general term referring to a compound such as silver oxide, silver sulfide, metallic silver, colloidal silver particles, silver halide, silver complex compounds, or silver ions, and phase states such as a solid state, a dissolved state in a liquid, or a gaseous state, as well as charge states such as a neutral state, an anionic state, or a cationic state are not particularly specified.

Basic Constitution of Display Element

In the display element of the invention, an ED display section is provided with one of the opposing electrodes. An electrode (1) near the ED display section is provided with a transparent electrode such as an ITO electrode as one of the opposing electrodes, while an electrode (2) is provided with a metal electrode such as a silver electrode, as the other one of the opposing electrodes. An electrolyte containing silver or a compound having silver in its chemical structure is supported between the electrode (1) and the electrode (2); application of an electrically positive or negative voltage between the opposing electrodes allows an oxidation reduction reaction of the silver on the electrodes (1) and (2), whereby a black silver image in a reduction state and a transparent silver form in an oxidation state are reversibly convertible.

In the invention, when driven in the direction of from no silver being deposited on the display electrode side to silver being deposited, the maximum A1 (mA/cm2) of absolute values of an electric current applied between the opposing electrodes refers to a maximum of absolute values of an applied current per unit area of the image display section when driven from the white state to the black state in the case of a black and white display. Further, when driven in the direction of from no silver being deposited on the display electrode side to silver being dissolved, the maximum A2 (mA/cm2) of absolute values of an electric current applied between the opposing electrodes refers to a maximum of absolute values of an applied current per unit area of the image display section when driven from the white state to the black state in the case of a black and white display. These electric current values can be determined by performing a measurement in a coulo-amperometry mode, while connecting the opposing electrodes of a display element to a probe of a commercially available electrochemical analysis instrument.

These electric current values can be controlled by optimally choosing the kind of electrode, the kind of an electrolyte material, the driving voltage and the current applied between the opposing electrodes.

When the opposing electrodes are driven in the direction of from a state of no silver being deposited on the side of the display electrode to that of the silver being dissolved before being driven in the direction of from a state of no silver being deposited on the side of the display electrode to that of the silver being deposited, deposition on the electrode opposing to a display electrode becomes uniform, resulting in enhanced driving stability of the display element.

Further, it is preferred that the following requirement is satisfied:

$$1.2 \leq d/L \leq 100$$

wherein d is a distance (in µm) between the opposed electrodes and L is a minimum (in µm) of distances between adjacent electrodes on the non-observation side (that is the non-display electrode side) of the display element. When being less than 1.2, the coverage area of a blackened image decreases, resulting in insufficient black display, while when being more than 100, sharpness of a blackened image from surrounding image elements becomes insufficient.

Furthermore, a surface roughness Ra (in nm) of the non-observation side is preferably $0.1 \leq Ra \leq 100$, and an Ra of less than 0.1 results in increased complexity of electrode production, while an Ra of more than 100 causes dropping of blackened silver, tending to causing unevenness in a white display.

Porous White Scattering Layer

In the invention, there may be provided a porous white scattering layer to enhance a display contrast and a white display reflectance.

A porous white scattering layer applicable to the invention is formed by coating an aqueous mixture of an aqueous polymer which is substantially insoluble in an electrolytic solvent and a white pigment, followed by being dried.

Examples of white pigments include titanium dioxide (an anatase type or a rutile type), barium sulfate, calcium carbonate, aluminum oxide, zinc oxide, magnesium oxide, zinc hydroxide, magnesium hydroxide, magnesium phosphate, magnesium hydrogen phosphate, alkaline earth metal salts, talc, kaolin, zeolite, acid clay, glass, as well as organic compounds such as polyethylene, polystyrene, acryl resins, ionomers, ethylene-vinyl acetate copolymer resins, benzoguanamine resins, urea-formalin resins, melamine-formalin resins and polyamide resins. These particles may be used singly or in combination. Also, the particles may contain voids to alter the refractive index.

Of these white pigment particles, there are preferably employed titanium dioxide, zinc oxide, and zinc hydroxide. More preferably are employed titanium dioxide which has been subjected to a surface treatment employing inorganic oxides (e.g., $Al_2O_3$, $AlO(OH)$, $SiO_2$). In addition to such surface treatments, titanium dioxide particles may be subjected to a treatment employing organic compounds such as trimethylolethane or triethanolamine acetic acid salts.

Of these white particulate materials, titanium oxide or zinc oxide are preferably used in terms of prevention of coloring at a relatively high temperature or reflectance of the display element which is influenced by the refractive index.

As aqueous polymer which is substantially insoluble in an electrolytic solvent are cited a water-soluble polymer and a polymer dispersed in an aqueous solvent.

Examples of a water-soluble polymer include proteins such as gelatin and its derivatives; natural compounds including polysaccharides, such as cellulose derivatives, starch, gum arabic, dextran, pullulan and carageenan; and synthetic polymer compounds such as polyvinyl alcohol, polyvinyl pyrrolidone, a acrylamide polymer and their derivatives. Gelatin derivatives include acetylated gelatin and phthalated gelatin, polyvinyl alcohol derivatives include an end alkyl-modified polyvinyl alcohol and an end mercapto-modified polyvinyl alcohol, and cellulose derivatives include hydroxyethyl cellulose, hydroxypropyl cellulose and carboxymethyl cellulose.

There are also usable compounds described in Research disclosure or JP-A No. 64-13546 at page 71-75 and highly water-absorbing polymers described in U.S. Pat. No. 4,960,681 and JP-A No. 62-245260, such as homopolymers of vinyl monomer containing —COOM or —$SO_3M$ (in which M is a hydrogen atom or an alkali metal) and copolymers of the foregoing monomers or those of these monomers and other vinyl monomers (e.g., sodium methacrylate, ammonium methacrylate, potassium methacrylate). These binders may be used singly or in combination.

In the invention are preferably used gelatin and its derivatives, and polyvinyl alcohol and its derivatives.

Examples of a polymer dispersible in an aqueous solvent include natural rubber latex and latexes of styrene butadiene rubber, butadiene rubber, nitrile rubber, chloroprene rubber and isoprene rubber; and thermosetting resins dispersible in an aqueous solvent, such as polyisocyanate, epoxy, acryl, silicone, urethane, urea, phenol, formaldehyde, epoxy-polyamide, melamine and alkyd resins and vinyl resin. Of these polymers, an aqueous polyurethane resin, as described in JP-A 10-76621, is preferred.

The expression, being substantially insoluble in electrolytic solvent is defined as an solution amount per 1 kg of electrolytic solvent being not less than 0 g and not more than 10 g at a temperature of from −20° C. to 120° C. The solution amount can be determined by a weight measurement method or a component quantitative measurement method by liquid chromatography or gas chromatography.

The aqueous mixture of an aqueous compound and a white pigment is preferably in the form of a white pigment dispersed in water. The volume ratio of aqueous compound/white pigment is preferably in the range from 1 to 0.01 and more preferably from 0.3 to 0.05.

The aqueous mixture of an aqueous compound and a white pigment may be coated at any position on a constituting component between opposing electrodes of the display element but is provided preferably on the surface of at least one opposing electrode. Methods of providing to the medium include a coating system and a liquid-spraying system, including a spray system through gas phase, such as a system of jetting liquid droplets by employing vibration of a piezoelectric element, for example, a ink-jet head of a piezo-system, a bubble jet system (trade name) of jetting liquid droplets by using a thermal head employing bumping, and a spray system of spraying liquid by air pressure or liquid pressure.

A coating system can be chosen from commonly known coating systems, including, for example, an air doctor coater, a blade coater, a rod coater, a knife coater, squeeze coater, a dipping coater, a reverse roller coater, a transfer roller coater, a curtain coater, a double roller coater, a slide hopper coater, a gravure coater, kiss roller coater, a bead coater, a cast coater, a spray coater, calender coater, and an extrusion coater.

An aqueous mixture of an aqueous compound and a white pigment which is provided on a medium may be dried by any method of evaporating water. Examples thereof include heating by a heat source, a heating method of using infrared light and a heating method employing electromagnetic induction. Distillation of water may be conducted under reduced pressure.

In the invention, the expression "porous" is referred to as follows: the foregoing aqueous mixture of an aqueous compound and a white pigment is coated onto an electrode and dried to form a white scattering material, onto which an electrolytic solution containing silver or a compound containing silver in the molecule is provided and sandwiched by opposing electrodes and when an electric potential difference is applied between the opposing electrodes to cause a solution and deposition reaction of silver, ionic species are movable and penetrable between the electrodes.

In the display element of the invention, it is preferred to perform a hardening reaction of the aqueous compound by a hardening agent during or after coating or drying of the aqueous mixture.

As a hardening agent usable in the invention are cited hardening agents described in, for example, U.S. Pat. No. 4,678,739, col. 41; U.S. Pat. No. 4,791,042; JP-A Nos. 59-116655, 62-245261, 61-18942, 61-249054, 61-245153, and 4-218044. Specific examples thereof include an aldehyde hardener, an aziridine hardener, an epoxy hardener, a vinylsulfone hardener [e.g., N,N'-ethylene-bis(vinylsulfonylacetoamido)ethane], a N-methylol hardener [e.g., dimethylol urea], boric acid and a polymeric hardener (compounds described in JP-A 62-234157). In case when using gelatin as an aqueous compound, a vinylsulfone hardener or chlorotriazine hardener is preferably used singly or in combination. In the case of using a polyvinyl alcohol, boric acid or metaboric acid is preferred.

These hardening agents are used preferably in amount of from 0.001 to 1 g per g of aqueous compound, and more preferably from 0.005 to 0.5 g. It is feasible to control humidity during the heat treatment or a hardening reaction to enhance film strength.

Compound Represented by Formulas (1)-(4)

In the display element of the invention, the electrolyte preferably contains at least one compound represented by the afore-described formula (1) or (2) and at least one compound represented by the afore-described formula (3) or (4).

First, there will be described a compound represented by formula (1).

In formula (1), L is an oxygen atom or $CH_2$ and $R_1$-$R_4$ are each a hydrogen atom, an alkyl group, an alkenyl group, an aryl group, a cycloalkyl group, an alkoxyalkyl group or an alkoxy group.

Examples of an alkyl group include methyl, ethyl, propyl, isopropyl, t-butyl, pentyl, hexyl, octyl, dodecyl, tridecyl, tetradecyl and pentadecyl; examples of an aryl group include phenyl, and naphthyl; examples of a cycloalkyl group include cyclopentyl and cyclohexyl; examples of a alkoxyalkyl group include β-methoxyethyl and γ-methoxypropyl; examples of an alkoxy group include methoxy, ethoxy, propyloxy, pentyloxy, hexyloxy, octyloxy, and dodecyloxy.

Specific examples of a compound of formula (1) are shown below but in the invention, they are not limited to these.

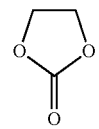

1-1

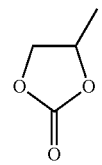

1-2

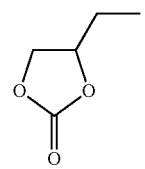

1-3

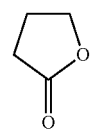

1-4

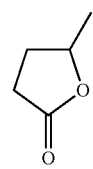

1-5

Next, there will be described a compound represented by formula (2).

In the formula (2), $R_5$ and $R_6$ are each a hydrogen atom, an alkyl group, an alkenyl group, an aryl group, a cycloalkyl group, alkoxyalkyl group or an alkoxy group.

Examples of an alkyl group include methyl, ethyl, propyl, isopropyl, t-butyl, pentyl, hexyl, octyl, dodecyl, tridecyl, tetradecyl and pentadecyl; examples of an aryl group include phenyl, and naphthyl; examples of a cycloalkyl group include cyclopentyl and cyclohexyl; examples of a alkoxyalkyl group include β-methoxyethyl and γ-methoxypropyl; examples of an alkoxy group include methoxy, ethoxy, propyloxy, pentyloxy, hexyloxy, octyloxy, and dodecyloxy.

Specific examples of a compound of formula (2) are shown below but in the invention, they are not limited to these.

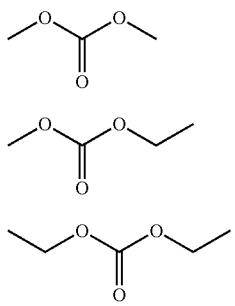

2-1

2-2

2-3

Of compounds of formula (1) and formula (2), above-exemplified compounds (1-1), (1-2) and (2-3) are specifically preferred.

The compound of formula (1) or formula (2) is one kind of electrolytic solvents but may be used in combination with other solvents within the range of not vitiating the object and effects of the invention. Specific examples of such solvents include tetramethylurea, sulfolane, dimethyl sulfoxide, 1,3-dimethyl-2-imidazolidinone, 2-(N-methyl)-2-pyrrolidinone, hexamethylphosphortriamide, N-methylpropioneamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, triethylene glycol monobutyl ether, and water. Of these solvents described above, it is preferred to contain at least one solvent exhibiting a freezing point of not more than −20° C. and a boiling point of not less than 120° C.

Other solvents usable in the invention include those shown in, for example, J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electorlytes Handbook", Vol. 1, Academic Press (1972).

In the invention, the electrolytic solvent may be single specie or a mixture of solvents, but a mixed solvent containing ethylene carbonate. The content of ethylene carbonate is preferably not less than 10% by mass and not more than 90% by mass. Specifically preferred electrolytic solvents are a mixed solvent having a mass ratio of propylene carbonate/ethylene carbonate of from 7/3 to 3/7. A propylene carbonate ratio of more than 7/3 results in deteriorated ionic conductivity and lowered response speed, and a propylene carbonate ratio of less than 3/7 easily forms precipitates at a low temperature.

The display element of the invention preferably employs a compound represented of the afore-described formula (3) or (4) together with a compound represented of the afore-described formula (1) or (2).

In the formula (3), $R_7$ and $R_8$ are each a substituted or unsubstituted hydrocarbon group, inclusive of a straight chain group and a branched group. The hydrocarbon group may contain at least one of a nitrogen atom, an oxygen atom, a phosphorus atom, a sulfur atom and a halogen atom, provided that when forming a S-containing ring, it is not an aromatic group. Further, atoms adjacent to the S atom preferably are carbon atoms.

Examples of a group capable of being substituted on the hydrocarbon group include an amino group, a guanidine group, a quaternary ammonium group, a hydroxy group, a halogen compound, a carboxylic acid group, a carboxylate group, an amido group, a sulfinic acid group, a sulfonic acid group, a sulfate group, a phosphonic acid group, a phosphate group, a nitro group and a cyano group.

In general, to cause solution and deposition of silver, it is necessary to solubilize silver in the electrolyte. For instance, it is general that a compound having a chemical structure specie exhibiting interaction with silver through weak covalent bonding to silver renders silver or a compound containing silver soluble. As such a chemical structure specie are known a halogen atom, a mercapto group, a carboxyl group and an imino group. In the invention, a thio-ether group also effectively acts as a solvent for silver, exerts little effect on co-existing compounds and exhibits high solubility in a solvent.

Specific examples of the compound of formula (3) are shown below but are by no means limited to these.

3-1: $CH_3SCH_2CH_2OH$
3-2: $HOCH_2CH_2SCH_2CH_2OH$
3-3: $HOCH_2CH_2SCH_2CH_2SCH_2CH_2OH$
3-4: $HOCH_2CH_2SCH_2CH_2SCH_2CH_2SCH_2CH_2OH$
3-5: $HOCH_2CH_2SCH_2CH_2OCH_2CH_2OCH_2CH_2SCH_2CH_2OH$
3-6: $HOCH_2CH_2OCH_2CH_2SCH_2CH_2SCH_2CH_2OCH_2CH_2OH$
3-7: $H_3CSCH_2CH_2COOH$
3-8: $HOOCCH_2SCH_2COOH$
3-9: $HOOCCH_2CH_2SCH_2CH_2COOH$
3-10: $HOOCCH_2SCH_2CH_2SCH_2COOH$
3-11: $HOOCCH_2SCH_2CH_2SCH_2CH_2SCH_2CH_2SCH_2COOH$
3-12: $HOOCCH_2CH_2SCH_2CH_2SCH(OH)CH_2SCH_2CH_2SCH_2CH_2COOH$
3-13: $HOOCCH_2CH_2SCH_2CH_2SCH(OH)CH(OH)CH_2SCH_2CH_2SCH_2CH_2COOH$
3-14: $H_3CSCH_2CH_2CH_2NH_2$
3-15: $H_2NCH_2CH_2SCH_2CH_2NH_2$
3-16: $H_2NCH_2CH_2SCH_2CH_2SCH_2CH_2NH_2$
3-17: $H_3CSCH_2CH_2CH(NH_2)COOH$
3-18: $H_2NCH_2CH_2OCH_2CH_2SCH_2CH_2SCH_2CH_2OCH_2CH_2NH_2$
3-19: $H_2NCH_2CH_2SCH_2CH_2OCH_2CH_2OCH_2CH_2SCH_2CH_2NH_2$
3-20: $H_2NCH_2CH_2SCH_2CH_2SCH_2CH_2SCH_2CH_2SCH_2CH_2NH_2$
3-21: $HOOC(NH_2)CHCH_2CH_2SCH_2CH_2SCH_2CH_2CH(NH_2)COOH$
3-22: $HOOC(NH_2)CHCH_2SCH_2CH_2OCH_2CH_2OCH_2CH_2SCH_2CH(NH_2)COOH$
3-23: $HOOC(NH_2)CHCH_2OCH_2CH_2SCH_2CH_2SCH_2CH_2OCH_2CH(NH_2)COOH$
3-24: $H_2N(=O)CCH_2SCH_2CH_2OCH_2CH_2OCH_2CH_2SCH_2C(=O)NH_2$
3-25: $H_2N(O=)CCH_2SCH_2CH_2SCH_2C(O=)NH_2$
3-26: $H_2NHN(O=)CCH_2SCH_2CH_2SCH_2C(=O)NHNH_2$
3-27: $H_3C(O=)NHCH_2CH_2SCH_2CH_2SCH_2CH_2NHC(O=)CH_3$
3-28: $H_2NO_2SCH_2CH_2SCH_2CH_2SCH_2CH_2SO_2NH_2$
3-29: $NaO_3SCH_2CH_2CH_2SCH_2CH_2SCH_2CH_2CH_2SO_3Na$
3-30: $H_3CSO_2NHCH_2CH_2SCH_2CH_2SCH_2CH_2NHO_2SCH_3$
3-31: $H_2N(NH)CSCH_2CH_2SC(NH)NH_2 \cdot 2HBr$
3-32: $H_2N(NH)CSCH_2CH_2OCH_2CH_2OCH_2CH_2SC(NH)NH_2 \cdot 2HCl$ 3-33: $H_2N(NH)CNHCH_2CH_2SCH_2CH_2SCH_2CH_2NHC(NH)NH_2 \cdot 2HBr$ 3-34: $[(CH_3)_3NCH_2CH_2SCH_2CH_2SCH_2CH_2N(CH_3)_3]^{2\alpha} \cdot 2Cl^-$ 3-35
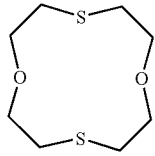

3-36
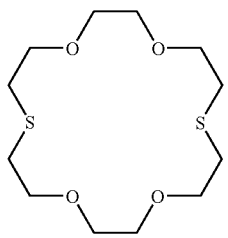

3-37
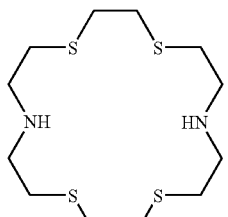

3-38
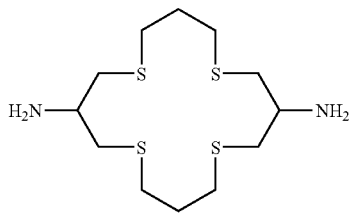

3-39
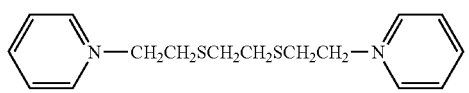

3-40

3-41
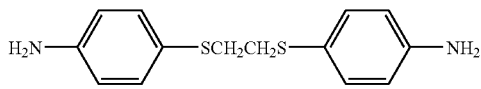

3-42
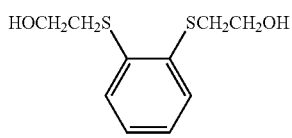

3-43
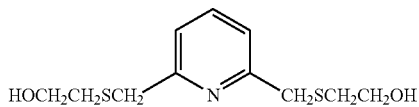

3-44
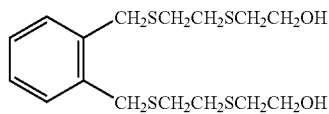

3-45
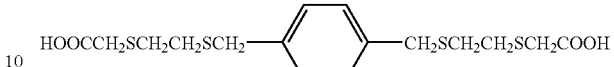

3-46
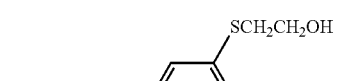

3-47

Of the foregoing compound, compound 3-2 is specifically preferred to achieve the objective effects of the invention.

Next, there will be described a compound represented by formula (4).

In the formula (4), M is a hydrogen atom, a metal atom or a quaternary ammonium; Z is a nitrogen-containing heterocyclic ring; n is an integer of 0 to 5; $R_9$ is a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxy group or a heterocyclic group, provided that when n is 2 or more, $R_9$s may be the same or different.

Examples of a metal atom represented by M of formula (4) include Li, Na, K, Mg, Ca, Zn and Ag. Examples of a quaternary ammonium include $NH_4$, $N(CH_3)_4$, $N(C_4H)_4$, $N(CH_3)_3Cl_2H_{25}$, $N(CH_3)_3C_{16}H_{33}$ and $N(CH_3)_3CH_2C_6H_5$.

Examples of a nitrogen-containing heterocyclic ring represented by Z of formula (4) include a tetrazole ring, a triazole ring, an imidazole ring, an oxadiazole ring, a thiazole ring, an indole ring, an oxazole ring, a benzoxazole ring, a benzimidazole ring, a benzthiazole ring, a benzoselenazole ring and a naphthoxazole ring.

Examples of a halogen atom represented by $R_9$ of formula (4) include a fluorine atom, chlorine atom, a bromine atom and iodine atom; examples of an alkyl group include methyl, ethyl, propyl, i-propyl, butyl, t-butyl, pentyl, cyclopentyl, hexyl, cyclohexyl, octyl, dodecyl, hydroxyethyl, methoxyethyl, trifluoromethyl, and benzyl; examples of an aryl group include phenyl and naphthyl; examples of an alkylcarbonamide group include acetylamino, propionylamino and butyloylamino; examples of arylcarbonamido group include benzoylamino; examples of an alkylsulfoneamido group include methanesulfonylamino and ethanesulfonylamino; examples of an arylsulfoneamido group include benzenesulfonylamino and toluenesulfonylamino; examples of an aryloxy group include phenoxy; examples of an alkylthio group include methylthio, ethylthio, and butylthio; examples of an arylthio group include phenylthio and tolylthio; examples of an alkylcarbamoyl group include methylcarbamoyl, dimethylcarbamoyl, ethylcarbamoyl, dimethylcarbamoyl, dibutylcarbamoyl, piperidylcarbamoyl and morpholylcarbamoyl; examples of arylcarbamoyl group include phenylcarbamoyl, methylphenylcarbamoyl, ethylphenylcarbamoyl, and benzylphenylcarbamoyl; examples of an alkylsulfamoyl group include methylsulfamoyl, dimethylsulfamoyl, ethylsulfamoyl, diethylsulfamoyl, dibutylsulfamoyl, piperidylsulfamoyl and morpholylsulfamoyl; examples of an arylsulfamoyl group include phenylsulfamoyl, methylphenylsulfamoyl, ethylphenylsulfamoyl, and benzylphenylsulfamoyl; examples of an alkylsulfonyl group include methanesulfonyl, and ethanesulfonyl; examples of an arylsulfonyl group include phenylsulfonyl, 4-chlorophenylsulfonyl and p-toluenesulfonyl; examples of an alkoxycarbonyl group include methoxycarbonyl, ethoxycarbonyl, and butoxycarbonyl; examples of an aryloxycarbonyl group include phenoxycarbonyl; examples of an alkylcarbonyl group include acetyl, propionyl, and butyloyl; examples of an arylcarbonyl group include benzoyl, and alkylbenzoyl; examples of an acyloxy group include acetyloxy, propionyoxy and bytyloyloxy; and examples of a heterocyclic group include an oxazole ring, thiazole ring, triazole ring, selenazole ring, tetrazole ring, oxadiazole ring, thiadiazole ring, thiazine ring, triazine ring, benzoxazole ring, benzthiazole ring, indolenine ring, benzoselenazole ring, naphthothiazole ring, triazaindolidine ring diazaindolidine ring, and tetrazaindolidine. These substituent groups may further be substituted by the foregoing substituent groups.

Specific examples of the compound of formula (4) are shown below but are by no means limited to these.

4-1
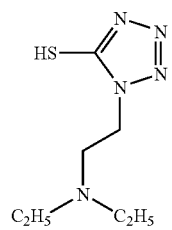

4-2
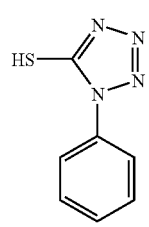

4-3
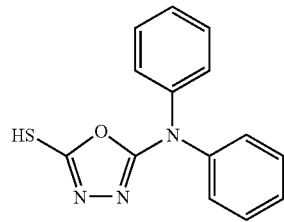

4-4
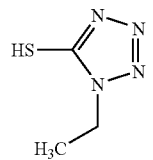

4-5
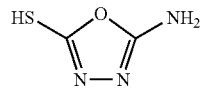

4-6
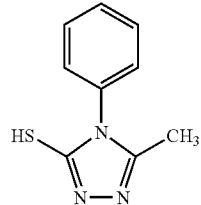

4-7
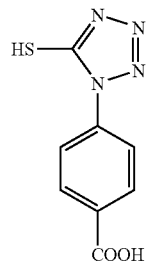

4-8
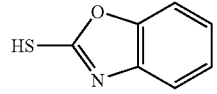

4-9
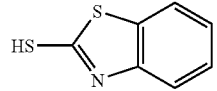

4-10
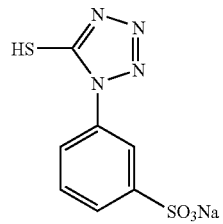

4-11
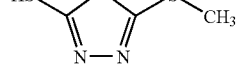

4-12
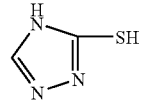

-continued 4-13
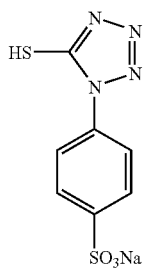

4-14
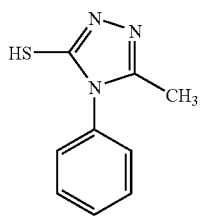

4-15
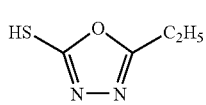

4-16
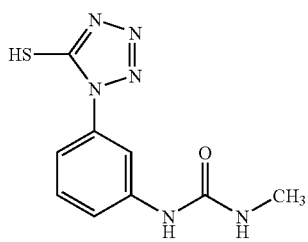

4-17
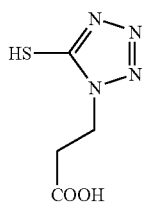

4-18
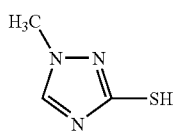

4-19
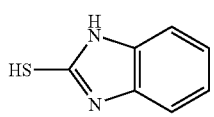

Of the foregoing compounds, exemplified compounds 4-12 and 4-18 are specifically preferred in terms of achieving the targeted effects of the invention.

Ratio of Halogen Ion to Silver Ion

The display element of the invention preferably meets expression (1):

$$0 \leq [X]/[Ag] \leq 0.01 \qquad \text{Expression (1)}$$

wherein [X] is a molar concentration (mole/kg) of halogen ions or halogen atoms contained in the electrolyte layer and [Ag] is a molar concentration (mole/kg) of silver or a compound containing a silver in the molecule, contained in the electrolyte layer.

The halogen atoms relating to the invention refer to iodine atoms, chlorine atoms, bromine atoms or fluorine atoms. A ratio [X]/[Ag] of more than 0.01 produces $X^- \rightarrow X_2$ in an oxidation-reduction reaction of silver and the produced $X_2$ readily cross-oxidizes black silver to allow dissolution of the black silver, becoming one of factors resulting in reduced memory capacity. The molar concentration ratio of halogen atom to silver is preferably as low as possible. In the invention it is more preferably $0 \leq [X]/[Ag] \leq 0.001$. When adding halogen ions, the sum of halogen species molar concentration is preferably in the order of [I]<[Br]<[Cl]<[F], in terms of enhanced memory.

Electrolyte/Silver Salt

In the display element of the invention are usable commonly known silver salt compounds, such as silver iodide, silver chloride, silver bromide, silver oxide, silver sulfide, silver citrate, silver acetate, silver behenate, silver p-toluenesulfonate, silver salts of mercapto-compounds and silver complexes with iminodiacetic acids. Of these silver salts, silver salts of a halogen, a carboxylic acid or a compound not containing a nitrogen atom capable of coordinating with silver are preferred, such as silver p-toluenesulfonate.

The concentration of silver ions contained in the electrolyte layer relating to the invention is preferably $$0.2 \text{ mol/kg} \leq [Ag] 2.0 \text{ mol/kg}.$$

A silver ion concentration of less than 0.2 mol/kg becomes a dilute silver solution, retarding the driving speed. A silver ion concentration of more than 2.0 mol/kg deteriorates solubility and disadvantageously tends to cause precipitation during storage at a low temperature.

In the display element of the invention, there may optionally be provided various constituting layers in addition to the above-described constituent elements.

Porous Electrode Containing Metal Oxide

The display element of the invention can employ a porous electrode containing metal oxides In the display element of the invention, it was found that when the electrode surface on the non-observation side (that is the side of being not image observation or the non-display side) of the opposing electrodes is protected with a porous electrode containing a metal oxide, an oxidation reduction reaction of silver or a compound containing silver in the chemical structure on the non-observation side is performed on or within the porous electrode containing a metal oxide, thereby resulting in increased choice of the kind of the electrode of the non-observation side and enhanced durability thereof.

Examples of a metal oxide constituting a porous electrode relating to the invention include titanium oxide, silicon oxide, zinc oxide, tin oxide, Sn-doped indium oxide (ITO), antimony-doped tin (ATO), fluorine-doped tin oxide (FTO), aluminum-doped zinc oxide and their mixtures.

Such a porous electrode can be formed by allowing plural particles of the above-described metal oxide to be bound to or in contact therewith. The average particle size of metal oxide particles is preferably from 5 nm to 10 μm, and more preferably from 20 nm to 1 μm. The specific surface area of metal oxide particles is preferably from $1 \times 10^{-3}$ to $1 \times 10^2$ m$^2$/g in the simple BET method, and more preferably from $1 \times 10^{-2}$ to 10 m$^2$/g. The form of metal oxide particles is not particularly limited but may be any one, such as an amorphous form, needle form, or a spherical form.

Metal oxide particles can be formed or bound by commonly known methods such as a sol-gel method a sintering method, as described in, for example, 1) Journal of the Ceramic Society of Japan, 102, 2, p. 200 (1994); 2) Yogyo- Kyokaishi 90, 4, p. 157; 3) J. of Non-Cryst. Solids, 82, 400 (1986). Alternatively, titanium oxide dendorimer particles are dispersed in a solution, coated on the substrate and dried at a temperature of 120 to 150° C. to remove any solvent, whereby a porous electrode can be obtained. Metal oxide particles are preferably in the form of being bound, which is preferably in the state having a durability of not less than 0.1 g in a continuous-loading type surface measurement instrument (for example, a scratch tester), and more preferably not less than 1 g.

In the invention, the expression "porous" represents that a porous electrode is disposed and an electric potential difference is applied between opposing electrodes, enabling to cause a dissolution and deposition reaction of silver and referring to a penetration state in which ionic species are movable within a porous electrode.

Electronic Insulation Layer

There may be provided an electronic insulation layer in the display element of the invention.

An electronic insulation layer usable in the invention may be any layer having a combination of ionic electric-conductivity and electronic insulating capability. Examples thereof include a solid electrolyte layer obtained by film-forming a polymer containing a polar group or its salt, a pseudo-solid electrolyte layer formed of a high-insulating porous layer carrying an electrolyte within voids, a polymeric porous layer having voids and a porous body of an inorganic material exhibiting a low specific-dielectric constant.

A porous layer can be formed by the known methods, including, for example, a sintering method or a fusion method (in which polymer particles or inorganic particles are partially fused together with a binder, and employing pores formed among particles), an extraction method (in which a constituent layer is formed of a solvent-soluble organic or inorganic materials and a solvent-insoluble binder and the organic or inorganic materials are dissolved with a solvent to obtain micro-pores), a foaming method in which a polymeric material is caused to foam by heating or degassing, a phase transformation method in which a mixture of polymers is subjected to phase separation by using a good solvent and a poor solvent, and a radiation exposure method in which various kinds of radiation rays are irradiated to form pores. Specific examples thereof include electronic insulation layers, as described in JP-A Nos. 10-30181 and 2003-107626; JP-B No. 7-95403 (hereinafter, JT-B refers to Japanese Patent Publication), and Japanese Patent Nos. 2635715, 2849523, 2987474, 3066426, 3464513, 3483644, 3535942 and 3062203.

Electrolyte Material

In the display element of the invention, a liquid electrolyte can contain therein compounds as below. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonium borofluoride, tetrabutylammonium borofluoride, and tetrabutylammonium halide. In addition, there are preferably used fused salt electrolyte compositions described in paragraphs [0062]-[0081] of JP-A No. 2003-187881. Further, there are also usable compounds which form oxidation-reduction pairs such as $I^-/I_3^-$, $Br^-/Br_3^-$ and quinone/hydroquinone.

Further, a solid electrolyte can contain therein compounds exhibiting electronic or ionic conductivity, as described below.

Examples of such compounds include fluorinated vinyl based polymers containing perfluorosulfonic acid, polythiophene, polyaniline, polypyrrole, triphenylamines, polyvinylcarbazoles, polymethylphenylsilanes, calcogenides such as $Cu_2S$, $Ag_2S$, $Cu_2Se$, and $AgCrSe_2$, fluorine compounds such as $CaF_2$, $PbF_2$, $SrF_2$, $LaF_3$, $TlSn_2F_5$, and $CeF_3$, lithium salts such as $Li_2SO_4$ and $Li_4SiO_4$ and compounds such as $ZrO_2$, CaO, $Cd_2O_3$, $HfO_2$, $Y_2O_3$, $Nb_2O_5$, $WO_3$, $Bi_2O_3$, AgBr, AgI, CuCl, CuBr, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3Cu_7Cl_{10}$, LiN, $Li_5NI_2$, and $Li_6NBr_3$.

There may be employed, as supporting electrolytes, electrolytes in gel form. When electrolytes are nonaqueous, there may be used oil gelling agents described in paragraphs [0058]-[2259] of JP-A No. 11-185836.

Thickening Agents to be Added to the Electrolyte Layer

In the display element of the invention, there may be used thickening agents in the electrolyte layer. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, poly(acrylic acid), and polyurethane as a transparent hydrophobic binder.

These thickening agents may be used in combination. There are further cited the compounds described on pages 71-75 of JP-A No. 64-13546. Of these, polyvinyl alcohols, polyvinylpyrrolidones, hydroxypropyl celluloses, and polyalkylene glycols are preferably used in terms of compatibility with various types of additives and enhancement of dispersion stability of white particles.

Other Additives to the Electrolyte Layer

Auxiliary layers of the display element of the invention include a protective layer, a filter layer, an antihalation layer, a crossover light cutting layer, and a backing layer. These auxiliary layers may contain chemical sensitizers, noble metal sensitizers, photosensitive dyes, supersensitizers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbents, anti-irradiation dyes, filter light absorbing dyes, fungicides, polymer latexes, heavy metals, antistatic agents, and matting agents.

The additives described above are detailed in Research Disclosure (hereinafter denoted simply as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds cited in RD are listed below.

| | Additives | | | | | |
|---|---|---|---|---|---|---|
| | RD 17643 | | RD 18716 | | RD 308119 | |
| | Page | Section | Page | Section | Page | Section |
| Chemical Sensitizers | 23 | III | 648 | right top | 96 | III |
| Sensitizing Dyes | 23 | IV | 648-649 | | 996-8 | IV |

-continued

| | Additives | | | | | |
|---|---|---|---|---|---|---|
| | RD 17643 | | RD 18716 | | RD 308119 | |
| | Page | Section | Page | Section | Page | Section |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |
| Hardeners | 26 | X | 651 | left | 1004-5 | X |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

Layer Configuration

The layer configuration between opposed electrodes related to the display element of the invention will now be described in more detail.

As the layer configuration related to the display element of the invention, it is possible to arrange a constituting layer containing positive hole transport materials. Examples of positive hole transport materials include aromatic amines, triphenylene derivatives, oligochiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CuSCN, $CuInSe_2$, Cu(In,Ga)Se, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$.

Substrates

There are preferably employed as substrates usable in the invention plastic films composed of polyolefins such as polyethylene or polypropylene, polycarbonates, cellulose acetate, polyethylene terephthalate, polyethylene dinaphthalene dicarboxylate, polystyrene naphthalates, polyvinyl chloride, polyimide, polyvinyl acetals, and polystyrene. In addition, preferred are syndioctatic structure polystyrenes. These are prepared employing the methods described, for example, in each of JP-A Nos. 62-117708, 1-46912, and 1-178505. Further, examples of supports include metal substrates including stainless steel, paper supports such as baryta paper or resin coated paper, supports including the above plastic film having thereon a reflection layer, and those which are described in JP-A No. 62-253195 (pages 29-31) as a support. There are also preferably used those described on page 28 of RD No. 17643, from the right column on page 647 to the left column on page 648 of RD No. 18716, and on page 879 of RD No. 307105. As described in U.S. Pat. No. 4,141,735, these supports may be subjected to a thermal treatment at a temperature lower than Tg so that core-set curl is decreased.

Furthermore, the surface of these supports may be subjected to a surface treatment with the aim of enhancement of adhesion of the support to other constituting layers. In the invention, there may be employed as surface treatments a glow discharge treatment, an ultraviolet radiation irradiation treatment, a corona treatment and a flame treatment. Further there may be employed supports described on pages 44-149 of Kochi Gijutsu No. 5 (published by AZTEC Corp., dated Mar. 22, 1991). There are further cited "Supports" described on page 1009 of RD No. 308119 and on page 108 of Product Licensing Index Volume 92. In addition, there are also usable glass substrates and epoxy resins kneaded with glass powder.

Electrode

In the display element of the invention, it is preferable that at least one of the opposed electrodes is a metal electrode. There may be employed, as a metal electrode, metals such as platinum, gold, silver, copper, aluminum, zinc, nickel, titanium, or bismuth and alloys thereof, which are known in the art. Preferred metals employed in the metal electrodes are those which exhibit a work function near the oxidation-reduction potential of silver in electrolytes. Of these, a silver electrode or an electrode having a silver content of at least 80 percent is advantageous to maintain a reduced state of silver, which also is superior in anti-staining of electrodes. Methods for preparing electrodes can employ conventional ones such as a evaporating method, a printing method, an ink-jet method, a spin coating method, and a CVD method.

Further, the display element of the invention preferably comprises a transparent electrode as at least one of the opposed electrodes. Transparent electrodes are not particularly limited so far as they are transparent and electrically conductive. Examples thereof include indium tin oxide (ITO), indium zinc oxide (IZO), tin oxide (FTO), indium oxide, zinc oxide, platinum, gold, silver rhodium, copper, chromium, carbon, aluminum, silicon, amorphous silicon, and BSO (bismuth silicon oxide). Such electrodes as described above can be formed, for example, in the manner that an ITO layer may be subjected to mask evaporation on a substrate employing a sputtering method, or after forming an ITO layer on the entire surface, patterning may be performed employing a photolithographic method. The surface resistance value is preferably 100 Ω/sq or less, and is more preferably 10 Ω/sq or less. The thickness of the transparent electrodes is not particularly limited but is commonly 0.1-20 μm.

Other Components Constituting the Display Element

The display element of the invention may optionally employs sealing agents, column-structured materials, and spacer particles.

Sealing agents are those to seal materials so that they do not leak out. There may be employed, as sealing agents, heat curing, light curing, moisture curing, and anaerobic curing resins such as epoxy resins, urethane resins, acryl resins, vinyl acetate resins, ene-thiol resins, silicone resins, or modified polymer resins.

Columnar structure materials provides strong self-supporting (strength) between substrates. Examples thereof include a cylindrical form, a quadrangular form, an elliptic cylindrical form, and a trapezoidal form, which are arranged at definite intervals in a specified pattern such as a lattice. Further, there may be employed stripe-shaped ones arranged at definite intervals. It is preferable that the columnar structure materials are not randomly arranged but arranged at an equal distance, arranged so that the interval gradually varies, or a predetermined pattern is repeated at a definite cycle so that the distance between substrates is appropriately maintained and image display is not hindered. When 1 to 40% of the display region of a display element is accounted for by the columnar structure materials, sufficient strength for commercial viability is achieved as a display element.

There may be provided a spacer between paired substrates to maintain a uniform gap between them. Examples of such a spacer include spherical materials composed of resins or inorganic oxides. Further, adhesion spacers are suitably employed the surface of which is coated with thermoplastic resins. In order to maintain the uniform gap between substrates, there may be provided only columnar structure materials. However, there may be provided both spacers and columnar structure materials. In place of the columnar structure materials, only spacers may be employed as a space-holding member. The diameter of spacers, when a columnar structure material is formed, is not more than its height, and is preferably equal to the height. When the column-structured material is not formed, the diameter of spacers corresponds to the distance of the cell gap.

Screen Printing

In the invention, sealing agents, columnar structure materials, and electrode patterns can be formed employing a screen printing method. In screen printing methods, a screen on which predetermined patterns are formed is covered on the electrode surface, and printing materials (compositions to form column-structured materials such as light-curing resins) are placed on the screen. Subsequently, a squeegee is moved at a predetermined pressure, angle and rate, whereby the printing materials are transferred onto the above substrate via the pattern of the screen. Then, the transferred materials are thermally cured and dried. When columnar structure materials are formed employing the screen printing method, resin materials are not limited to light-curable resins, but there may also employed, for example, heat curable resins such as epoxy resins or acryl resins and thermoplastic resins. Examples of thermoplastic resin include a polyvinyl chloride resin, a polyvinylidene chloride resin, a polyvinyl acetate resin, a polymethacrylic acid ester resin, a polyacrylic acid ester resin, a polystyrene resin, a polyamide resin, a polyethylene resin, a polypropylene resin, a fluorocarbon resin, a polyurethane resin, a polyacrylonitrile resin, a polyvinyl ether resin, a polyvinyl ketone resin, a polyether resin, a polyvinyl pyrrolidone resin, a saturated polyester resin, a polycarbonate resin, and a chlorinated polyether resin. It is preferable that resin materials are employed in the form of a paste obtained through, for example, solution in suitable solvents.

As noted above, after forming the columnar structure materials on the substrate, spacers are provided on at least one side of the substrate, and paired substrates are placed so that the electrode forming surfaces are opposed to each other, whereby an empty cell is formed. By heating the paired opposing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then simultaneously sealed when the substrates are allowed to adhere to each other.

Driving Method of Display Element

In the display element of the invention, it is preferred to perform a driving operation such that black silver is allowed to be deposited by applying a voltage more than the deposition overpotential and deposition of black silver continues with applying a voltage not more than the deposition overpotential. Performing such a driving operation results in reduction of write energy, reduced load of the drive circuit and enhanced writing speed. Existence of overpotential in the electrode reaction is generally known in the field of electrochemistry. The overpotential is detailed in, for example, "Chemistry of Electron Transfer/Introduction of Electrochemistry" (1996, published by Asakura Shoten) on page 121. The display element of the invention is regarded as an electrode reaction of an electrode and silver within an electrolyte so that existence of an overpotential in dissolution and deposition of silver is readily understand. Since the magnitude of an overpotential controls an exchange current density, from the fact that after formation of black silver, deposition of black silver can be continued by voltage application of not more than a deposition overpotential, it is assumed that the surface of black silver can readily perform electron injection at lower excess energy.

The driving operation of the display element of the invention may be simple matrix drive or an active matrix drive. In the invention, the simple matrix drive refers to a driving method of successive application of current to a circuit in which a positive electrode line including plural positive electrodes and a negative electrode line including plural negative electrodes are opposed to each other and cross in the vertical direction. The use of a simple matrix drive enables simplification of the circuit structure and the driving IC, resulting in advantages such as lowered production cost. Active matrix drive refers to a system in which scanning lines, data lines, and current feeding lines are formed in a checkered pattern and driving is performed by TFT circuits arranged in each of the squares of the checkered pattern. Since switching is performed for each pixel, advantages result in gradation as well as memory function. Accordingly, there can be used the circuit described, for example, in FIG. 5 of JP-A No. 2004-29327.

Commercial Application

It is feasible to apply the display element of the invention to ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers and passports.

EXAMPLES

The embodiments of the present invention will be further described with reference to examples but the invention is by no means limited to these. In examples, designation "part(s)" or "%" is used and represents "part(s) by mass" or "% by mass" unless otherwise noted.

Example 1

Preparation of Display Element
Preparation of Display Element 1
Preparation of Electrolytic Solution 1

To 2.5 g of dimethylsulfoxide were added 90 mg of sodium iodide and 75 mg of silver iodide and completely dissolved, and then, 150 mg of polyvinyl pyrrolidone (average molecular weight of 15000) was further added and stirred for 1 hr. with heating at 120° C. to obtain an electrolytic solution 1.

Preparation of Electrode 1

An ITO film with a 130 μm electrode width and a pitch of 145 μm was formed on a 1.5 mm thick 1 cm×4 cm glass substrate according to a commonly known method to obtain a transparent electrode (namely, electrode 1).

Preparation of Electrode 2

A silver-palladium electrode with an electrode thickness of 0.8 μm, a pitch of 145 μm and an electrode spacing of 130 μm was formed on a 1.5 mm thick 1 cm×4 cm glass substrate according to a commonly known method to obtain an electrode 2.

Preparation of Electrode 3

A mixed solution which was obtained by dispersing 20% by mass of a titanium oxide in an isopropanol solution containing 2% by mass of polyvinyl alcohol (having an average molecular weight of 3500 and a saponification degree of 87%) by use of an ultrasonic homogenizer was coated at a thickness of 100 μm on the electrode 2 bordered with an olefinic sealing agent containing spherical glass beads having an average particle diameter of 40 μm in an amount of 10% volume fraction and then dried at 15° C. for 30 min. to evaporate the solvent and further dried in an atmosphere at 45° C. for 1 hr. to prepare an electrode 3.

Preparation of Display Element

The electrodes 3 and 4 were pasted so that stripe-formed electrodes bisected each other at right angles and were then pressed with heating to prepare an empty cell. The electrolytic solution 1 was poured into the empty cell and its inlet was sealed with an ultraviolet ray-curable resin to prepare a display element 1.

Preparation of Display Element 2
Preparation of Electrolytic Solution 2

To 2.5 g of dimethylsulfoxide were added 0.09 g of silver p-toluenesulfonate, 0.01 g of silver chloride and an exemplified compound 4-15, and completely dissolved, then, 150 mg of polyvinyl pyrrolidone (having an average molecular weight of 15000) was further added and stirred for 1 hr. with heating at 120° C. to obtain an electrolytic solution 2.

A display element 2 was prepared similarly to the foregoing display element 1, except that the electrolytic solution 1 used in the preparation of the display element 1 was replaced by the electrolytic solution 2.

Preparation of Display Element 3

A display element 3 was prepared similarly to the display element 2, except that the exemplified compound 4-15 used for the electrolytic solution 2 was replaced by an exemplified compound 3-2.

Preparation of Display Element 4
Preparation of Electrolytic Solution 3

To 2.5 g of propylene carbonate were added 0.10 g of silver p-toluenesulfonate and an exemplified compound 4-12 and completely dissolved, and then, 150 mg of polyethylene glycol (average molecular weight of 15000) was further added and stirred for 1 hr. with heating at 120° C. to obtain an electrolytic solution 3.

A display element 4 was prepared similarly to the display element 1, except that the electrolytic solution 1 used for the display element 1 was replaced by the electrolytic solution 3.

Preparation of Display Element 5

A display element 5 was prepared similarly to the display element 4, except that the exemplified compound 4-12 used for the electrolytic solution 3 was replaced by an exemplified compound 3-2.

Measurement of Current Value

The measurement of A1 and A2 was conducted in the following manner. Probes of an electrochemical instrument (HZ-5000, produced by Hokuto Denko Co., Ltd.) were connected to both ends of opposed electrodes of a display element and coulo-amperometry was performed in the application direction of the individual display element to determine the maximum of absolute values of current values via a current-time curve.

Evaluation of Display Element: Variation in Color Tone

Using a spectral calorimeter CM-3700d, produced by Konica Minolta Sensing Inc., the driving condition for the individual display element was determined at an applied voltage of ±1.5 V so that an L* value in D65 light source was 65, then, an L* value, an a* value and a b* value when blackened under this driving condition were each measured and designated as L1, a1 and b1, respectively. Thereafter, whitening-blackening was repeated 1000 times under this driving condition, then, the L* value, the a* value and the b* value when blackened again were measured and designated as L2, a2 and b2, respectively.

From each of the obtained measurement values was calculated $\Delta E=[(L2-L1)^2+(a2-a1)^2+(b2-b1)^2]^{1/2}$ as an evaluation value for variation in color tone. Obtained results are shown in Table 1. A less ΔE value indicates a lower variation in color tone and being superior when repeatedly driven.

TABLE 1

| Display Element | A1/A2 | ΔE | Remark |
|---|---|---|---|
| 1 | 3.5 | 25.3 | Comp. |
| 2 | 4.3 | 8.1 | Inv. |
| 3 | 4.1 | 6.9 | Inv. |
| 4 | 6.5 | 2.9 | Inv. |
| 5 | 6.1 | 3.5 | Inv. |

As is apparent from the results set forth in Table 1, display elements comprised of the constitution as defined in the invention resulted in reduced variation in color tone even after being repeatedly driven, and being superior characteristics.

What is claimed is:

1. A display element comprising opposing electrodes and an electrolyte containing silver or a compound including silver in the chemical structure between the opposing electrodes, wherein the opposing electrodes are driven so that the silver is dissolved or deposited and the following requirement is satisfied:

$$A1/A2>4$$

wherein A1 (mA/cm$^2$) is a maximum of absolute values of an electric current applied between the opposed electrodes when driven in the direction of from a state of no silver being deposited on a display electrode side to that of the silver being deposited and A2 (mA/cm$^2$) is a maximum of absolute values of an electric current applied between the opposing electrodes when driven in the direction of from a state of no silver being deposited on the display electrode side to that of the silver being dissolved.

2. The display element as claimed in claim 1, wherein the opposing electrodes are driven in the direction of from a state of no silver being deposited on the side of the display electrode to that of the silver being dissolved before driven in the direction of from a state of no silver being deposited on the side of the display electrode to that of the silver being deposited.

3. The display element as claimed in claim 1 wherein the following requirement is satisfied:

$$1.2 \leq d/L \leq 100$$

wherein d (μm) is a distance between the opposed electrodes and L (μm) is a minimum of distances between adjacent electrodes on a non-observation side of the opposing electrodes.

4. The display element as claimed in claim 1, wherein the following requirement is satisfied:

$$0.1 \leq Ra \leq 100$$

wherein Ra (nm) is a surface roughness of an electrode on a non-observation side of the opposing electrodes.

5. The display element as claimed in claim 1, wherein the electrolyte comprises at least one compound represented by the formula (1) or (2) and at least one compound represented by the formula (3) or (4):

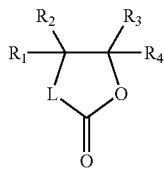

formula (1)

wherein L is an oxygen atom or $CH_2$; $R_1$ through $R_4$ are each a hydrogen atom, an alkyl group, an alkenyl group, an aryl group, a cycloalkyl group, an alkoxyalkyl group or an alkoxy group;

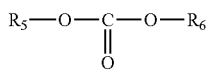

formula (2)

wherein $R_5$ and $R_6$ are each a hydrogen atom, an alkyl group, an alkenyl group, an aryl group, a cycloalkyl group, an alkoxyalkyl group or an alkoxy group;

formula (3)

wherein $R_7$ and $R_8$ are each a substituted or unsubstituted hydrocarbon group, provided that when $R_7$ or $R_8$ combine with each other to form a S-containing ring, the ring is not an aromatic group;

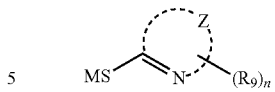

formula (4)

wherein M is a hydrogen atom, a metal atom or a quaternary ammonium; Z is a nitrogen-containing heterocyclic ring; n is an integer of 0 to 5; $R_9$ is a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxy group or a heterocyclic group, provided that when n is 2 or more, $R_9$s may be the same or different or may combine to form a condensed ring.

6. The display element as claimed in claim 1, wherein the display element meets the following relation (1):

$$0 \leq [X]/[Ag] \leq 0.01 \quad \text{relation (1)}$$

wherein [X] is a molar concentration (mole/kg) of halogen ions or halogen atoms contained in the electrolyte and [Ag] is a total molar concentration (mole/kg) of silver contained in the electrolyte or silver included in the compound including silver in the chemical structure.

* * * * *